UNITED STATES PATENT OFFICE.

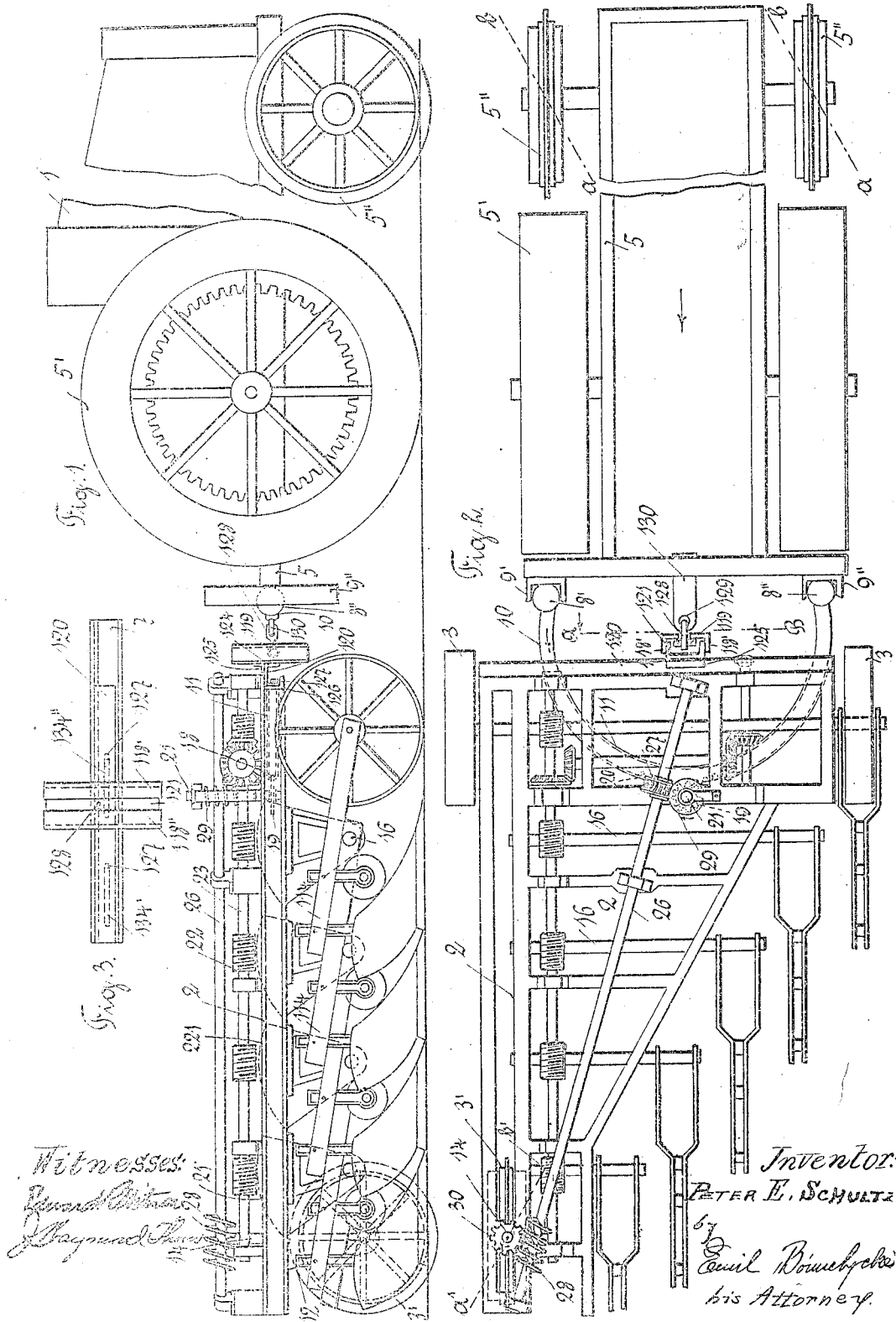

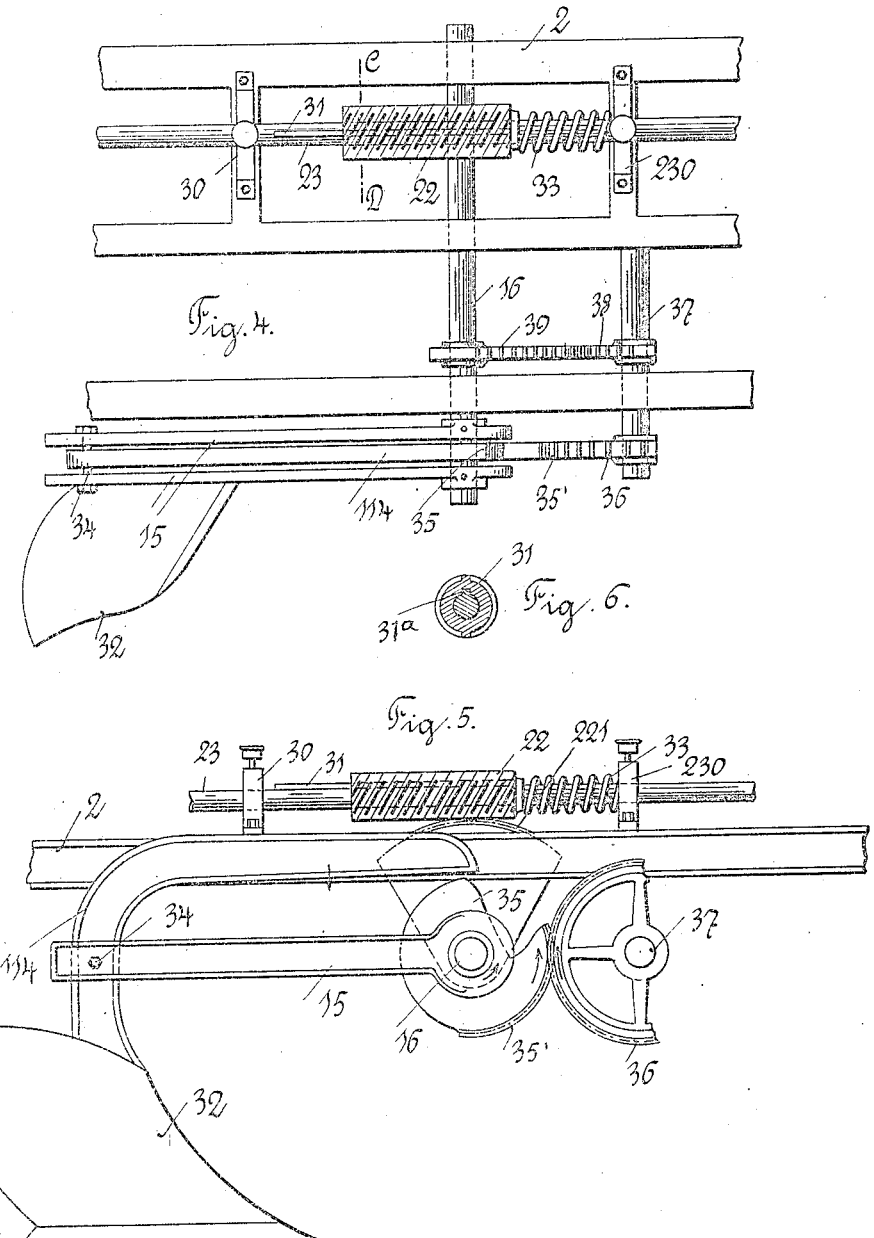

PETER ERWIN SCHULTZ, OF BERLIN-GRUNEWALD, GERMANY.

MOTOR-PLOW.

1,151,622.  Specification of Letters Patent.  Patented Aug. 31, 1915.

Application filed January 23, 1914. Serial No. 813,980.

*To all whom it may concern:*

Be it known that I, PETER ERWIN SCHULTZ, a subject of the King of Prussia, German Emperor, and resident of Berlin-Grunewald, in the Kingdom of Prussia, German Empire, have invented an Improved and Novel Motor-Plow, of which the following is a specification.

This invention relates in general to motor plows of the kind in which a plowshare trailer is drawn by a tractor, and in particular to a motor plow in which the connection between the tractor and the trailer is such that this latter may freely follow the inequalities of the ground. The essential difference in this respect between the known construction and the present novel one consists in this that movable supports or bearings are made use of, which are also connected with each other in such a manner that if one of them is moved in one direction, the other is moved correspondingly in the opposite direction whereby the trailer is allowed to move freely around a vertical axis with respect to the tractor, and its steerableness especially in curves is not in the least impaired. Moreover, the possibility is afforded to adjust the plowshare trailer in various angles with respect to the longitudinal axis of the tractor by an appropriate adjustment of the movable supports or bearings, in such a manner that the trailer remains in the just adjusted position also when the tractor goes rearward which is important for the complete and exact working of corners.

My invention is illustrated in the annexed drawings, in which:

Figure 1 is a side view of the tractor (its middle portion being broken away) and of the plowshare trailer, Fig. 2 is a plan of the parts shown in Fig. 2, Fig. 3 is a section in line A—B of Fig. 2, Fig. 4 shows some details in plan and on an enlarged scale, Fig. 5 is a side view of these parts, and Fig. 6 is a section in line C—D of Fig. 4.

The tractor 1 may be of any convenient type and may have two driving wheels 5' and two steering wheels 5''. The frame 2 of the trailer is carried by the front supporting wheels 3 and the rear steering wheel 3'.

Staying the trailer laterally with respect to the tractor is effected by abutments that may be formed by balls 8' 8'' which are located within counter abutments 9' 9'' attached to the tractor. In the form of construction shown as an example the balls 8' 8'' are affixed to a circularly curved piece, for instance a tube 10, that may be displaced in another curved tube 11 secured to the beam 7. If desired, the two tubes may have apertures so that they may be connected with each other, after adjustment, by a bolt put through the respective coinciding apertures. Or the part 10 may be formed by a curved rack meshing with a fixable pinion. If the tubes, or their equivalents, are not secured in their position the tube 11 may displace upon the tube 10 in curves, but if both parts are connected with each other the trailer may be driven rearward by the tractor exactly in the curve determined by the respective adjustment, which is important for plowing corners and the like. The position of the parts in question may, however, be reversed in that the counter abutments are attached to the trailer, the other parts (8' 8'' 10 11) to the tractor. Or the tube 10 may form a felly of a wheel that allows of being adjusted and secured in various positions with regard to the tractor. Or the ends of the front beam may be connected with the ends of a double-armed lever attached to the tractor, those connections being effected on each side by two bars or links which are also connected with each other and the lever being adapted to be adjusted and secured in place in various positions with respect to the tractor. Or the abutment parts 8' 8'' may be formed by pistons of two cylinders connected by a common pipe so that the movement of one of the pistons causes a corresponding movement of the other piston in the opposite direction. To be able to secure in position the two abutments also in this instance, that pipe is provided with a cock which is closed when the pistons are in their relative positions desired, the pistons being thus compelled to remain in those positions.

In Figs. 1 and 2 the tube 11 has at its rear a longitudinal slot 18 of such a length that the teeth of a pinion 19 may enter that tube. Opposite to that slot the tube 10 has a series of holes 20 meshing with said pinion. This latter is affixed to a shaft 21 supported in the frame 2. Coupling the abutments 8' 8'' with the rear steering wheel 3' is effected by a shaft 26 also supported by the frame 2 and having a worm wheel 27 and a worm 28, the former meshing with a worm 29 of the shaft 21 and the other with a worm wheel 30 of the shaft 14. As the position of the tube 10 depends upon the angle between the tractor and the trailer, it is obvious that the shaft 21 is turned by the pinion 19, the rotation being transmitted by the gearing 29 27 26 28 30 to the shaft 14, whereby, the ratio being appropriately chosen, the rear steering wheel is turned laterally just as far as corresponds to the angle between the tractor and the trailer, this latter following thus exactly in the respective curve, forward, as well as backward. Suppose, the steering wheels of the tractor are turned into the position indicated by the dotted lines a—b, Fig. 2, the tractor is driven in this direction for some short distance sufficient to cause the tube 10 to displace correspondingly within the tube 11, the final result of this displacement being the lateral turning of the rear steering wheel 3', as already described. When then the tubes 10 and 11 are connected with each other by their holes and a bolt, as already mentioned, or by any other means, or if some other one of the parts concerned has been made use of for securing the whole in the other position in question, the trailer may be shoved rearward exactly in the respective curve. In the same way the adjustment is made for going in a straight line, or more or less to the right or to the left, as the case may be.

The movement of the tube 10 may be transmitted to the rear steering wheel also by other means, for instance by rope disks and a crossed rope or by chain disks and a crossed chain, the disks or the chain wheels being affixed to the upper ends of the vertical shafts 14 and 21.

The means for connecting the tractor and the trailer with each other consist preferably of a vertical groove formed, for instance, by angular pieces 118' 118'' secured to the U-shaped girder 121, and of a roll 119 that may freely glide up and down in said groove. In the form of construction shown, this roll is attached to the tractor, but it may be attached to the trailer and the groove-forming parts may be secured to the tractor. The connection of these parts with the girder 121 is effected by means of a girder 120 connected in its turn with the girder 121 by means of the leg 124 and the angular piece 125, further with the beam 7 of the trailer frame by means of the leg 126 and the screw 127. To fasten the roll 119 to the tractor, the bar 128 which encompasses said roll is connected by a hinge 129 with a bar 130 affixed to the frame 1. It is obvious that owing to this connection the tractor and the trailer are connected as by a universal joint that can also move up and down without any material change of the distance between said two main parts.

The fastening of the girder 120 to the beam 7 is made in such a manner that the guide groove may be laterally adjusted. For this purpose the girder 120 is, in the example in question, provided with longitudinal slots 134' 134'' through which the fastening bolts 127 pass (Figs. 1 and 3). This lateral adjustability is important just for trailers of the kind in which the symmetrical longitudinal axis of the plow shares does not coincide with the symmetrical longitudinal axis of the ground or road wheels. If, for instance, the groove would act on the beam 7 at the place shown in Fig. 2, viz. about in the symmetrical axis with respect to the wheels, the trailer would be drawn in the proper position upon a road, the shares being then raised, but during plowing the trailer would assume an oblique position. To obviate this, the groove is displaced laterally on the beam 7 so as to make it act in the symmetrical longitudinal axis with respect to the shares. If, thus, the guide groove shall be displaced from the position shown in Figs. 2 and 3, in which it acts in the symmetrical longitudinal axis of the road wheels, into the position corresponding to the symmetrical longitudinal axis of the shares, the bolts 127 are loosened, the girder 120 is shoved appropriately far to the left (Fig. 3) and then the bolts are screwed home again.

The plow beams 114 are rotatably supported in the trailer 2 by means of the shafts 16 to which they are affixed, and the shafts are connected with each other in such a manner that the shares may be simultaneously and uniformly lifted and lowered by an appropriate rotation of said shafts. For this purpose each of the shafts 16 has affixed to it a worm wheel sector 221 meshing with a worm 22 secured to a shaft 23 common to all these worms. The shaft 23 may be rotated by hand, either directly or by means of an intermediate gearing or by the mediation of a flexible shaft driven by the motor of the machine. By rotating the shaft 23 in one or the other direction the shafts 16 are rotated by means of the worms 22 and the worm wheel sectors 221 so as either to lift or to lower the shares, as desired.

In the form of construction shown in Figs. 4–6, the worms 22 are attached by means of a feather 31 and a groove 31$^a$ in such a manner that they cannot turn upon the shaft but may be displaced along it. Normally, the worms 22 are held fast by springs 33 in that position in which the shares are in proper working position, each spring bearing on one side against the respective worm and on the other side against the neighboring bearing 230.

The share shank 114 is rotatably supported, by means of the bolt 34, in the fork 15 upon the shaft 16, and its free end rests upon a cam 35 which may loosely rotate upon the shaft 16 and a part of which forms a toothed sector 35′ or is connected with such a one. This sector meshes with a pinion 36 affixed to a shaft 37 supported in the frame 2. Another toothed sector 38 also affixed to the shaft 37 meshes with a sector 39 secured to the shaft 16. The curve of the cam 35 and the ratio of transmission of the gearing 35′—39 is such that if the cam 35 is turned, also the shank 114 of the share 32 is turned in the fork 15 in such a manner that the share is raised or lowered always parallelly to itself.

If the share is to be introduced into the ground, the shaft 23 is rotated in the appropriate direction, when, by means of the sector 221, the shaft 16 and the fork 15, not only the share will be lowered, but also the cam 35 will be turned upon the shaft 16, in the direction of the arrow, Fig. 5, by means of the sectors 39 38 36 and 35′. The end of the share shanks therefore contacts with deeper and deeper laying points of the cam disk so that the shank and the share are turned around the bolt 34, in such a manner, that, from reasons already stated, the share remains always parallel to itself. The device operates in the same manner when the share is lowered or adjusted for another plowing depth.

During this adjustment, as well as during the plowing, the worms are held in the operative position shown by the springs 33. If, however, the resistance to be overcome by the shares exceeds a certain limit, the share may give way in upward direction, displacing the worm to the left, Fig. 4, contrary to the pressure of the spring, by means of the fork 15, the shaft 16, and the sector 221. When the obstacle has been overcome or passed, the compressed spring moves the parts in question back into their former position.

Having now described my invention, what I desire to secure by a Patent of the United States is:

1. In a motor plow, the combination, with a tractor and a trailer stayed with respect to the tractor but adapted to form an angle with it, of movable abutments, and means connecting them in such a manner that a movement of one of said abutments entails a corresponding movement of the other place in any of its various positions.

2. In a motor plow, the combination, with a tractor and a trailer stayed with respect to the tractor but adapted to form an angle with it, of movable abutments attached to a circularly bent guide rotatably attached to the trailer and adapted to be secured in place in any of its various position.

3. In a motor plow, the combination, with a tractor, and a trailer stayed with respect to the tractor but being adapted to form an angle with the same, of movable abutments between the tractor and the trailer; a steering wheel at the rear end of the trailer; and connections between said abutments and said steering wheel; said connections being adapted to turn the steering wheel laterally, for the purpose as described.

4. In a motor plow, the combination, with a tractor and a trailer stayed with respect to the tractor, of movable abutments between the tractor and the trailer; a circularly bent guide for said abutments; a steering wheel at the rear end of the trailer; and means for transmitting the movements of said guide to the steering wheel, substantially as described.

5. In a motor plow, the combination, with a tractor and a trailer stayed with respect to the same, of movable abutments between said parts; a circularly bent tube having the trailer abutments affixed to it; a correspondingly bent guide tube for said first tube; a steering wheel at the rear of the trailer; means adapted to transmit the lateral displacements of the first tube to said steering wheel; and means allowing of an upward and downward movement of the connecting parts at the trailer, substantially as described.

6. In a motor plow, the combination, with a tractor and a trailer stayed with regard to said tractor, of movable abutments, of a coupling between the tractor and the trailer; said coupling being adapted to allow of a lateral movement of one of its parts, substantially and for the purpose as described.

In testimony whereof I affix my signature in presence of two witnesses.

PETER ERWIN SCHULTZ.

Witnesses:
  MAX RAUSCH,
  WOLDEMAR HAUPT.